UNITED STATES PATENT OFFICE.

CHRISTIAN RUDOLPH, OF OFFENBACH, GERMANY, ASSIGNOR TO THE FIRM OF K. OEHLER, OF SAME PLACE.

AZO DYE.

SPECIFICATION forming part of Letters Patent No. 468,049, dated February 2, 1892.

Application filed July 29, 1891. Serial No. 401,090. (Specimens.)

*To all whom it may concern:*

Be it known that I, CHRISTIAN RUDOLPH, a subject of the Emperor of Germany, and a resident of Offenbach, Germany, have invented new and useful Improvements in Coloring-Matters, of which the following is a specification.

The way of producing the new dye-stuff consists in combining tetrazodiphenyl or ditolyl-chloride with one molecule of amidooxyalpha-naphthalinedisulpho acid and with one molecule of metaoxydiphenylamine or metaoxytolylphenylamine. For example, eleven parts of tolidine or the corresponding quantity of benzidine are dissolved in seventy-five parts of muriatic acid of 12.5 per cent. and five hundred parts of water. After cooling the solution to zero, seven parts of sodium nitrite are added and the whole is poured into a solution of twenty parts of potassium salt of amidooxy-alphanaphthalinedisulpho acid in seven hundred parts of soda-lye of two per cent. In this manner so-called "intermediate compounds" are formed, which can be transformed into the new dye-stuff by further treating them with a solution of ten parts of metaoxy-diphenylamine or eleven parts of metaoxy-tolylphenylamine in twenty parts of a ten-per-cent. caustic soda-lye. The dye-stuff formed is precipitated by common salt pressed and dried. The dye-stuff obtained with any of these different compounds forms a blackish powder with a metallic luster, dyeing unmordanted cotton directly blackish violet. It dissolves in water with violet-blue color and in concentrated sulphuric acid with blue color. Reducing agents, such as zinc-dust or soda-lye, discolor the dye-stuff solutions.

What I claim, and desire to secure by Letters Patent, is—

1. The method of producing the violet black tetrazo dye-stuff obtained by treating tetrazodiphenyl or ditolyl with one molecule of amidooxyalphanaphthalinedisulpho acid and with one molecule of metaoxydiphenylamine or metaoxytolylphenylamine, substantially as herein described.

2. The dye-stuff herein described, consisting of a blackish powder with metallic luster having the properties of dyeing unmordanted cotton directly blackish violet, dissolving in water with violet-blue color and in concentrated sulphuric acid with blue color, and having its solutions discolored by reducing agents, such as zinc-dust or soda-lye.

In testimony whereof I have signed my name to this specification in the presence of two subscribing witnesses.

CHRISTIAN RUDOLPH.

Witnesses:
ALVESTO P. HOGUE,
JEAN GRUND.